US006981212B1

(12) United States Patent
Claussen et al.

(10) Patent No.: US 6,981,212 B1
(45) Date of Patent: Dec. 27, 2005

(54) EXTENSIBLE MARKUP LANGUAGE (XML) SERVER PAGES HAVING CUSTOM DOCUMENT OBJECT MODEL (DOM) TAGS

(75) Inventors: Christopher Shane Claussen, Austin, TX (US); Michael Haden Conner, Austin, TX (US); Matthew Dale McClain, Austin, TX (US); Benjamin Charles ZumBrunnen, Farmington Hills, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,598

(22) Filed: Sep. 30, 1999

(51) Int. Cl.[7] ............................................. G06F 15/00
(52) U.S. Cl. ...................... 715/513; 715/514; 715/515; 715/501.1; 717/144; 717/148; 709/203; 709/219
(58) Field of Search ............................ 715/501.1, 513, 715/514, 515; 717/144, 148; 709/203, 219

(56) References Cited

U.S. PATENT DOCUMENTS

| | | | |
|---|---|---|---|
| 5,745,908 A | | 4/1998 | Anderson et al. |
| 5,835,712 A | * | 11/1998 | DuFresne .................... 709/203 |
| 6,012,098 A | | 1/2000 | Bayeh et al. |
| 6,014,680 A | | 1/2000 | Sato et al. |
| 6,125,391 A | * | 9/2000 | Meltzer et al. .............. 709/223 |
| 6,188,401 B1 | * | 2/2001 | Peyer ......................... 345/805 |
| 6,192,382 B1 | | 2/2001 | Lafer et al. |
| 6,209,124 B1 | | 3/2001 | Vermeire et al. |
| 6,212,640 B1 | * | 4/2001 | Abdelnur et al. ........... 713/201 |
| 6,226,675 B1 | * | 5/2001 | Meltzer et al. .............. 709/223 |
| 6,266,681 B1 | * | 7/2001 | Guthrie ..................... 715/501.1 |
| 6,308,198 B1 | * | 10/2001 | Uhler et al. ................. 709/200 |
| 6,330,574 B1 | | 12/2001 | Murashita |
| 6,347,307 B1 | | 2/2002 | Sandhu et al. |
| 6,370,561 B1 | * | 4/2002 | Allard et al. ............... 709/203 |
| 6,381,743 B1 | | 4/2002 | Mutschler, III |
| 6,418,446 B1 | | 7/2002 | Lection et al. |
| 6,456,308 B1 | * | 9/2002 | Agranat et al. ............. 345/854 |
| 6,480,865 B1 | | 11/2002 | Lee et al. |
| 6,507,856 B1 | | 1/2003 | Chen et al. |

(Continued)

OTHER PUBLICATIONS

WorldWide Web Consortium, Extensible StyleSheet Language (XSL) Specification, W3C Working Draft Apr. 21, 1999, found online at www.w3.org/TR/1999/WD-xsl-19990421, pp. 1-18.*

(Continued)

*Primary Examiner*—Joseph Feild
*Assistant Examiner*—Rachna Singh
(74) *Attorney, Agent, or Firm*—Jeffrey S. LaBaw; Joseph R. Burwell

(57) ABSTRACT

A method for serving a web page uses eXtensible Markup Language (XML) server pages. The first time a page is accessed, a given flat file is parsed into an XML Document Object Model (DOM), and required tag libraries are loaded. The DOM tree is then traversed, preferably in a depth-first, inside-out manner to locate custom tags. Upon locating a custom tag, if the tag is registered as a Java object, the object is loaded. A process method is then called on the object, passing the custom tag's tree node. The Java object then examines the custom tag and replaces it with an object, e.g., script code. Alternatively, if the tag is registered as an XSL stylesheet, the stylesheet is loaded and passed, together with the DOM, to an XSL processor. The processor applies the template to the custom tag and replaces it with given script code. Once all custom tags are reduced to HTML and script code, the DOM is compiled into a Java servlet to service the client request.

21 Claims, 7 Drawing Sheets

U.S. PATENT DOCUMENTS 6,560,633 B1 * 5/2003 Roberts et al. ............. 709/202
2002/0073398 A1   6/2002 Tinker
2003/0028561 A1   2/2003 Gounares et al.

OTHER PUBLICATIONS

David Wood et al., XMLC Tutorial Version 1.02, Jul. 1, 1999, found online at staff.pisoftware.com/dwood/xmlc-tutorial.*

WorldWide Web Consortium, Document Object Model (DOM) Level 1 Specification, Version 1.0, W3C Recommendation Oct. 1, 1998, pp. 1-47.*

News Release, Lutris™ Delivers XML Compiler Leading to Open Source Application Server, Jul. 6, 1999, found online at www.enhydra.org/aboutEnhydra/newsAndEvents/news/Enhydra_2.1.html.*

Stefano Mazzocchi, "eXtensible Server Pages (XSP) Layer 1" (Jun. 11, 1999), downloaded on Jul. 8, 2003 from http://xml.coverpages.org/WD-xsp-19990611.html.*

Pelegri-Llopart et al., *JavaServer Pages™ Specification*, Version 1.1—Public Release, Sun Microsystems, Inc. Aug. 18, 1999.

Pelegri-Llopart et al., *JavaServer Pages™ Specification*, Version 1.0, Sun Microsystems, Inc., Sep. 27, 1999.

Gonsalves, "Lutris' server divides duties", *eWEEK*, http://zdnet.com/filters/printerfriendly/0,6061,409493-2,00.html, Jul. 11, 1999.

Kung, "The Next Generation Web Servers", *MU-SPIN Ninth Annual Users' Conference*, http://www.cs.nsu.edu/others/research/mu_spin/muspin99.pdf, Sep. 27, 1999.

JavaServer Pages Specification 1.0, Sun Microsystems Inc., ftp://ftp.java.sun.com/pub/jsp/798flk/jps1_0-spec.pdf, Sep. 27, 1999.

World Wide Web Consortium (W3C), "Namespaces in XML", W3C Recommendation Jan. 14, 1999, www.w3.org.

"XML-Based Templates for Generating Artifacts form Java-Based Models", RD 416103, *Research Disclosure*, p. 1678, Dec. 1998.

"Parameterized XSL Style Sheets", RD 423110, *Research Disclosure*, p. 1009, Jul. 1999.

"Converting HTML to Well Formed XML With Preference Based Tag Expansion", RD 423111, *Research Disclosure*, p. 1011, Jul. 1999.

World Wide Web Consortium (W3C), "HTML 4.0 Specification", W3C Recommendation Apr. 24, 1998, www.w3.org, pp. 238-240.

Kung, "The Next Generation Web Servers", MU-SPIN Ninth Annual Users' Conference, Sep. 27, 1999.

Sundsted, "Java Makes the most of XML", *JavaWorld Magazine*, Jul. 1999.

Gonsalves, "Lutris' server divides duties", *eWeek*, www.zdnet.com/zdnn, Jul. 11, 1999.

Hildyard, "An XML Document to JavaScript Object Converter", *Web Techniques*, v. 4, n. 1, pp. 63-69, 1999.

Gardner, "Open-source application server enters the fray", *InfoWorld*, Apr. 14, 1999.

Wood, "The Web Document API", SoftQuad, Inc., 1999.

Fields, "Java Servlets for JavaScripters", http://web.archive.org, Jan. 1999.

Lie et al., "Multipurpose Web Publishing Using HTML, XML, and CSS", *Comm. of the ACM*, v. 42, n. 10, Oct. 1999.

* cited by examiner

EXTENSIBLE MARKUP LANGUAGE (XML) SERVER PAGES HAVING CUSTOM DOCUMENT OBJECT MODEL (DOM) TAGS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records but otherwise reserves all copyright rights whatsoever.

BACKGROUND OF THE INVENTION

1. Technical Field

The present invention relates generally to Internet publishing technologies and, in particular, to techniques for dynamically serving web page content.

2. Description of the Related Art

A Hypertext Markup Language (HTML) file uses a limited set of tags to convey basic information about the structure of a web document, e.g., whether given text is a heading or a paragraph. With HTML, the style and logic of the document are hardcoded. HTML does not provide tags that define the meaning of the page element. To address this limitation, web content is now being authored in eXtensible Markup Language (XML), which provides a way for an author to create a custom markup language to suit a particular kind of document. In XML, each document is an object, and each element of the document is an object. The logical structure of the document typically is specified in a Document Type Definition (DTD). A DTD may be used by the author to define a grammar for a set of tags for the document so that a given application may validate the proper use of the tags. ADTD comprises a set of elements and their attributes, as well as a specification of the relationship of each element to other elements. Once an element is defined, it may then be associated with a stylesheet, a script, HTML code or the like. Thus, with XML, an author may define his or her own tags and attributes to identify structural elements of a document, which may then be validated automatically. An XML document's internal data structure representation is a Document Object Model (DOM). The DOM makes it possible to address a given XML page element as a programmable object. It is basically a tree of all the nodes in an XML file.

Page serving technologies are evolving at a rapid pace. Since 1997, three new major technologies have attempted to supplement, if not replace, dynamically generated HTML, i.e. database or CGI scripts used to generate a web page on the fly. These technologies are Microsoft's active server page (ASP), Sun Microsystems's Java server page (JSP), and the Extensible Style Sheet Language (XSL/XSLT) being promoted by the World Wide Web Consortium(W3C). They provide for the generation and serving of dynamic web page content by enabling a page creator to write HTML and then to embed pure programming logic inside the page markup. Microsoft's ASP and Sun's JSP are very similar in that they both are essentially web templates that enable given code (e.g., code written in Java) to be embedded in static HTML to be served in response to a client browser request. In an illustrative example, a server (and, in particular, a Java runtime servlet) responds to a client .jsp request as follows: the servlet retrieves a flat file corresponding to the requested page, translates that file into a Java servlet, compiles the servlet, class loads the servlet, and then invokes the servlet to cause given (e.g., customized) web content to be returned to the requesting browser. XSL/XSLT, to the contrary, is rooted in formatting and manipulating XML. XSLT, in particular, provides extensible mechanisms for defining templates to manipulate XML of any custom DTD.

The existing techniques for serving dynamic content have various limitations. Conventional server-side scripting on a web page can be complicated and, therefore, such scripting is usually difficult to maintain and evolve. Further, with existing technologies, typically only a single scripting language is allowed on a web page. This limitation is acceptable, so long as only one author is responsible for editing the page, or if all of the responsible authors know and use the same scripting language and the language of choice is supported by the web server. Microsoft's ASP technology supports multiple scripting languages, but only one language may be used on a page. Moreover, multiple languages cannot be embedded in one another, and their order of execution is undefined. Further, page-serving technologies such as ASP and JSP are not XML-compliant, and neither ASP nor JSP provides an extension mechanism to allow authors to add custom tags.

It is also known in the art to provide a web page author with a library of preexisting custom tags. An illustrative product of this type is Cold Fusion, which is HTML-centric. This product, however, does not afford the author the ability to create custom tags. Macromedia's Dreamweaver product has a tag construction mechanism, but this product does not allow for the embedding of custom tags, nor does it allow the document to be reorganized by the tags. It also keeps the script code on the page. In particular, the script is hidden from the user, but it is still present on the page, and it may be viewed and/or edited from within another editor. However, the modifications made in another tool are not maintained. Microsoft provides a similar technology, called design-time control (DTC), that hides code from the user but still maintains the code on the page. DTC is not XML-compliant and it does not allow DTCs to be embedded within one another. Nor does the DTC mechanism allow the document to be reorganized. In addition, the DTC syntax is quite cumbersome for the page author. Moreover, while other DTC-aware tools will hide the script code correctly, basic text-editors can still edit the code, and the changes made will not be importable back into the DTC-aware tools. DTC also does not provide access to the Document Object Model. Other products or technologies that have custom tag extensions include HeiTML and Meta-HTML. Essentially, these are tag macro definition languages for HTML. Such languages, however, are not XML compliant.

There remains a need in the art to provide new techniques for publishing Internet content that can fully leverage the manipulation and template mechanism of XSLT with the scripting capability of the JSP/ASP model. The present invention addresses this need.

BRIEF SUMMARY OF THE INVENTION

It is a primary object of the present invention to provide a server page handling mechanism that enables custom tags to be extended with XML/DOM. As used herein, a "custom" tag is a element that defines a semantic of given content in the page, which may be uniquely specified by a web page author. Web page authors can use this mechanism to add custom tags to the page markup, with these tags serving as markers that initiate the invocation of tag handlers that, in turn, perform simple macro (i.e. static) substitution or complex algorithmic reorganization and manipulation of the document.

It is another more specific object of the present invention to enable authoring of a web page with custom tags that, at page translation time, are converted (e.g., by a Java object or an XSL stylesheet) into script code. This script code is then compiled into Java code, and then into a Java servlet, for servicing a given client HTTP request. Preferably, the script code is kept separate from the page.

It is another more general object of this invention to provide a server page handling engine that is built on top of XML.

Another more general object of this invention is to provide a framework and runtime that, in effect, combines the manipulation and template mechanism of XSLT with the scripting capability of page serving technologies such as JSP and ASP. The invention provides the advantages of XSLT scripting but does not require the overhead of interpretation at request time.

According to an embodiment of the present invention, a web page author may define a custom DOM (Document Object Model) tag in a web page that, at page-translation time, is converted into script code (e.g., by a Java object or an XSL stylesheet). This script code is then compiled into Java code, and then into a Java servlet, yielding excellent performance in servicing a client's request for the page. Because the custom tag serves as a marker for a tag handler that manipulates the document, the page is kept clean and easy to maintain. The script code is kept separate and, therefore, need only be debugged once.

In a preferred embodiment, custom tags are registered in an XML tag library file. This file preferably includes the name of the custom tag as well as a Java object name or a URL naming an XSL stylesheet. The first time the page is accessed, the page handling engine of the present invention parses it into an XML Document Object Model (DOM), and all the required tag libraries are loaded. The engine then traverses the DOM tree, preferably in a depth-first inside out manner, looking for registered custom tags. Upon finding one, if the tag is registered as a Java object, a bean is loaded, and a "process" method is then called, passing the custom tag's tree node. The Java object has access to the entire DOM, and it may modify the DOM however it deems necessary. Thus, for example, the Java object examines the custom tag and replaces it with other custom tags, script code, or HTML. Once processing is complete, the DOM is reexamined to identify any new tag library directives and new custom tags. If necessary, appropriate tag bean handlers are then invoked recursively according to a custom tag search algorithm.

According to a preferred embodiment, a method for processing a document object model (DOM) tree including a set of custom tags begins by verifying a DOM data representation (e.g., a tree) against a Document Type Definition (DTD). Thereafter, the DOM tree is examined in a given manner, preferably, in a depth first, inside-out manner. For each custom tag in the DOM tree, the routine performs a number of substeps: retrieving a left-most leaf node in the tree that is the custom tag, invoking a handler for the left-most leaf node, e.g., to replace the custom tag with given script code, and registering, with a tag registry, any new tag libraries that are generated as a result of invoking the handler. After all custom tags in the DOM tree have processed up the tree, the tree is preferably collapsed into a fewest possible number of method blocks.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
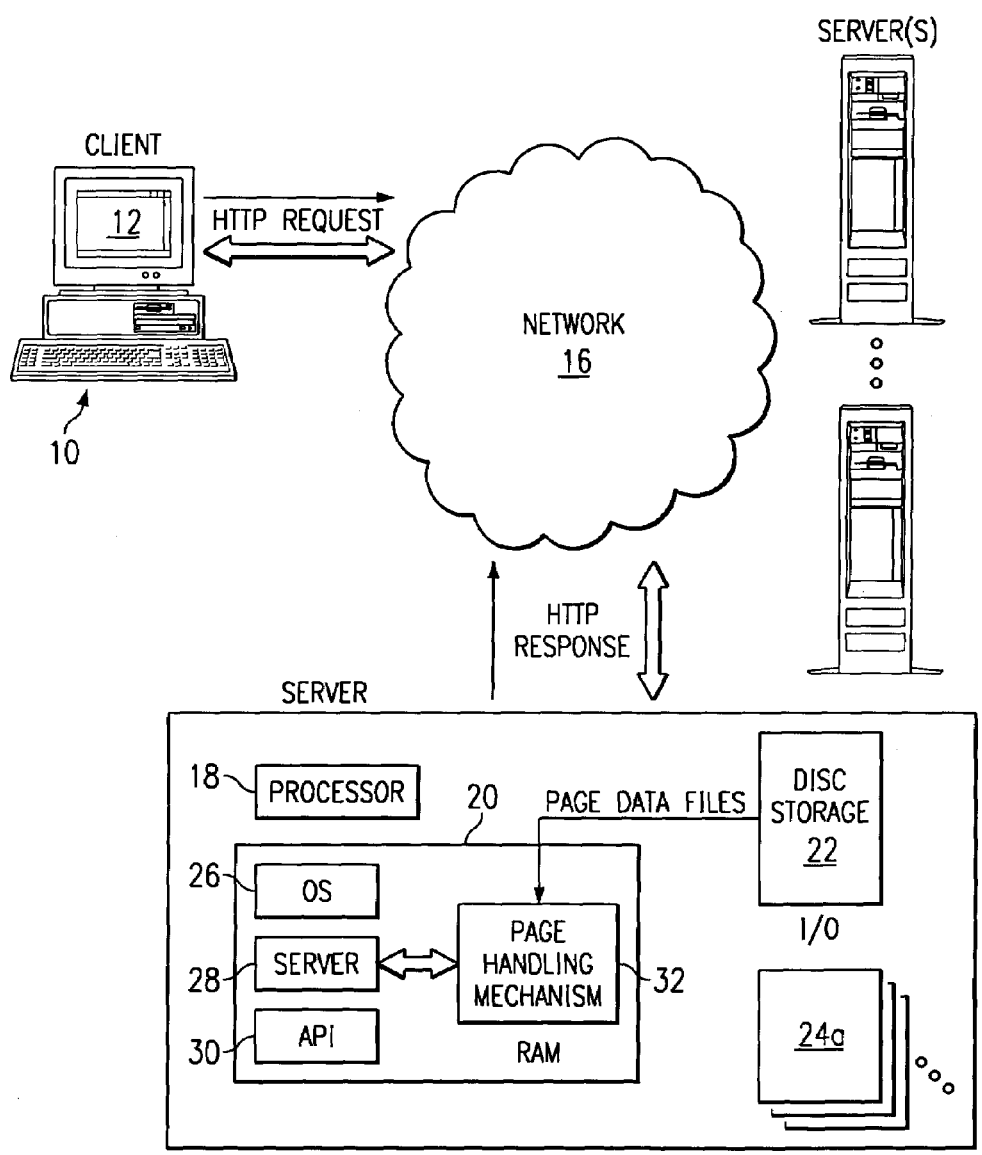
FIG. 1 is a simplified illustration of a client-server environment in which the present invention may be implemented.

The present invention is a page handling framework and runtime engine operative on a server in a computer network such as the Internet. As is well-known, in the Internet paradigm as illustrated in FIG. 1, a client machine, such as machine 10, may use an application, such as a web browser 12, to access a server 14 via a computer network 16. Network 16 typically includes other servers (not shown) for control of domain name resolution, routing and other control functions. A representative server 14 is a computer or workstation having at least one processor 18, system memory (e.g., RAM) 20, disk or other permanent storage 22, I/O devices 24a–n, an operating system 26, a server program 28, and an application programming interface (API) 30 that provides extensions to enable application developers to extend and/or customize the core functionality thereof through software programs including plug-ins, CGI programs, Java servlets, and the like. One such software program is an inventive page handling mechanism 32, which processes an HTTP page request and generates a response by feeding data into an output stream as will be described. In an illustrative embodiment, the page handling mechanism is implemented in Java and is executable in a Java Virtual Machine(JVM) by a processor in a known manner. Alternatively, the program may be written in whole or in part in native code. The inventive functionality, of course, may be part of the integral web server program.

A representative server machine is an IBMNetfinity platform running the Unix operating system and a server program such as IBM WebSphere Version 2.0. Of course, any other computer hardware or software may be used.

A representative client is a personal computer, notebook computer, Internet appliance or pervasive computing device (e.g., a PDA or palm computer) that is Pentium-, PowerPC®- or RISC-based. The client includes an operating system such as Microsoft Windows, Microsoft Windows CE or PalmOS. A typical client includes a suite of Internet tools including a Web browser, such as Netscape Navigator or Microsoft Internet Explorer, that has a Java Virtual Machine (JVM) and support for application plug-ins or helper applications. Communications between the client and the server typically conform to the Hypertext Transfer Protocol (Version 1.0 or higher), and such communications may be made over a secure connection.

The flowcharts of FIGS. 2–11 illustrate the inventive functionality of the page handling mechanism.

Servlet Generation

Figure 2:
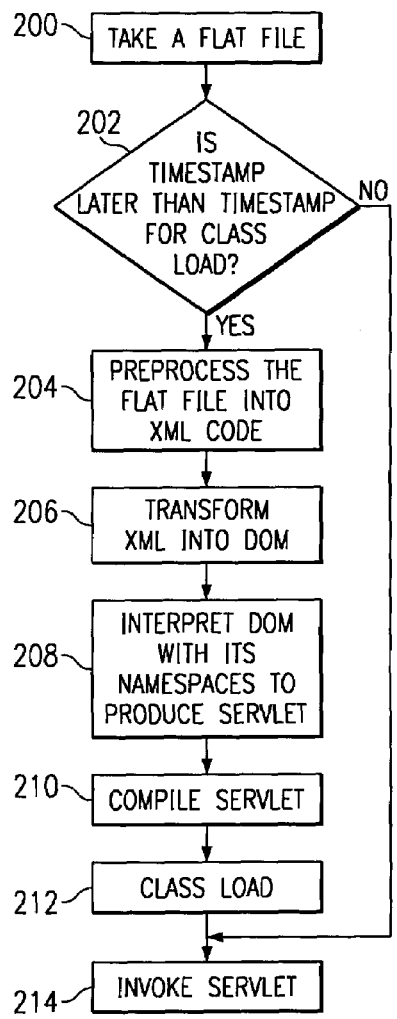
FIG. 2 is a high level flowchart illustrating a servlet generation routine of the present invention.

FIG. 2 illustrates how a flat web page file is processed according to the present invention to generate a servlet. The routine begins at step 200 by retrieving a flat file from the server's database. At step 202, a test is made to determine whether a timestamp for the flat file is later than a timestamp for the class load for the file. If the outcome of the test at step 202 is negative, the file has already been processed. Control then branches to step 214, where the file is invoked as a runtime operation. If the outcome of the test at step 202 is positive, the routine continues at step 204 to preprocess the flat file into XML compliant code and, at step 206, to transform the XML into a Document Object Model (DOM) data representation. The Document Object Model is a platform- and language-neutral interface that allows programs and scripts to dynamically access and update the content, structure and style of documents. In particular, the Document Object Model provides a standard set of objects for representing HTML and XML documents, a standard model of how these objects can be combined, and a standard interface for accessing an manipulating them. The Document Object Model (DOM) Level 1 Specification is available from the World Wide Web Consortium.

Figure 3:
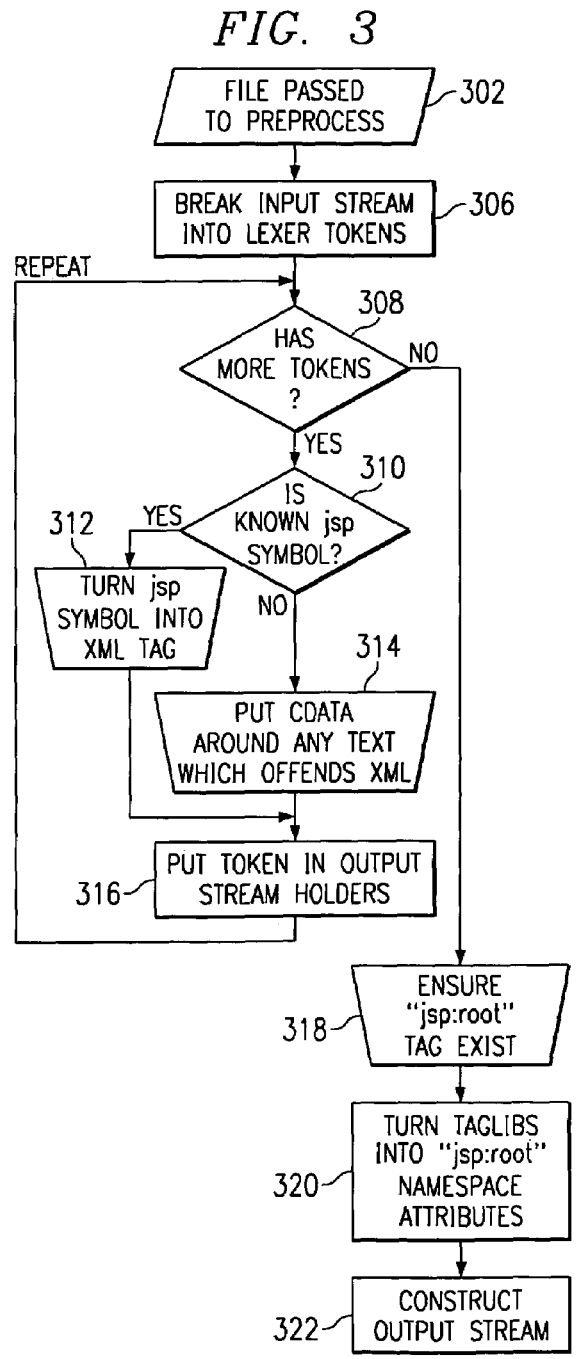
FIG. 3 is a flowchart illustrating how one preferred technique for preprocessing a flat file into XML compliant code.

Step 204 is illustrated in more detail in FIG. 3. Preferably, steps 204–206 are accomplished concurrently using an XML parser, such as the IBM WebSphere XML4J parser. The routine then continues at step 208. At this step, the DOM along with its namespaces are interpreted to produce a Java object, such as a servlet. This process is illustrated in more detail in FIG. 4. Thus, according to the invention and, in particular, steps 204, 206 and 208, the present invention generates a page template via DOM translation of the flat file. At step 210, the servlet is compiled. The routine then continues at step 212 to class load the servlet. Control then continues at step 214, which has been previously described.

Steps 204–212 preferably occur at page translation time. Page translation typically occurs the first time the page (namely, the request for the flat file) is accessed or hit. Step 214 is executed to serve the requested page in response to the originating HTTP client request. In particular, the servlet is invoked with standard Http Request and Http Response objects, and it generates a response by feeding data into an output stream. The data is provided to the client browser for rendering in the usual manner.

The above-described invention provides several advantages over the prior art. As noted above, the routine illustrated in FIG. 2 preferably occurs at page translation time, which provides significant processing efficiencies. Moreover, the invention enables custom tags to be embedded within one another, which has not been available in the known art. The invention provides the further advantage of enabling the implementation of translation semantics using XSL stylesheets, which is also new to the art.

File Preparsing

FIG. 3 illustrates a preferred technique preparsing a flat file into XML compliant code. This was step 204 in FIG. 2.

The routine begins at step 302 by passing the flat file to the preprocessor. At step 306, the input stream comprising the flat file is broken into tokens. The routine then performs a test at step 308 to determine whether the stream has any more tokens to process. If so, the routine continues at step 310 to test whether the token is a known JSP (or ASP) symbol. If the outcome of the test at step 310 is positive, the routine branches to step 312 to turn the JSP symbol into an XML tag. If the outcome of the test at step 310 is negative, the routine branches to step 314 to identify any text that violates XML constraints. Following either step 312 or step 314, the routine continues at step 316 to place the token in an output stream holder. Control then returns to step 308 to process additional tokens. If the outcome of step 308 is negative, however, the routine branches to step 318 to verify that the "jsp:root" tag exists in the stream. At step 320, the parser turns tag libraries into "jsp:root" namespace attributes. The routine then continues at step 322 by constructing the output stream. This completes the preparsing routine.

Processing a DOM with Custom Tags

Figure 4:
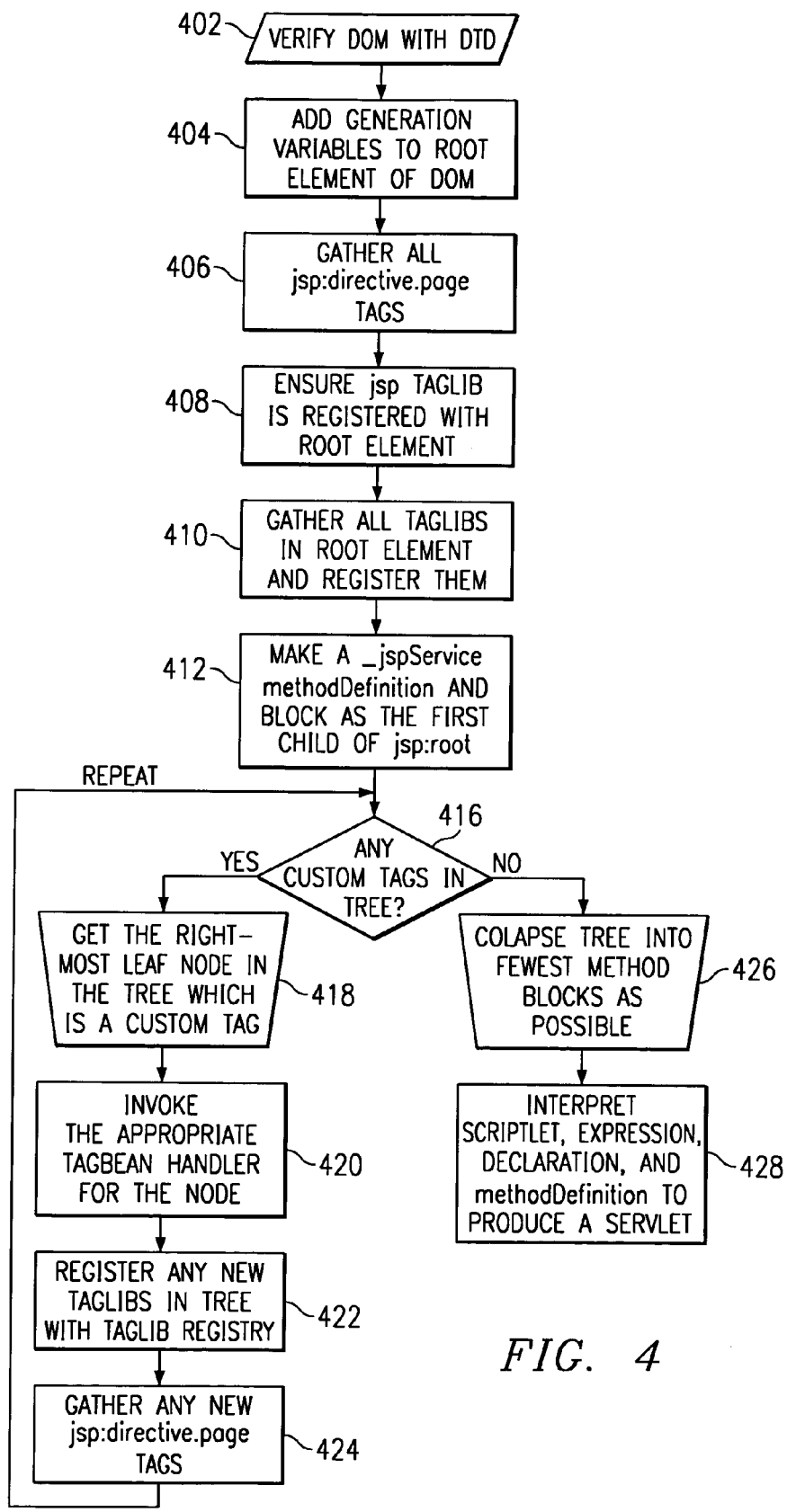
FIG. 4 is a flowchart illustrating a preferred algorithm for processing custom tags according to the present invention.

A preferred algorithm for processing a DOM with custom tags is illustrated in FIG. 4. Preliminary processing is provided by steps 402–412. These steps may be omitted. In particular, the routine begins at step 402 by verifying the DOM, for example, with a JSP DTD. At step 404, the routine adds servlet generation variables to the root element of the DOM for later handling. The routine then continues at step 406 to gather all jsp:directive.page tags to ensure a consistent state. At step 408, the jsp tag libraries (which provide support for JSP 1.0 mechanisms) are registered with the root element. Thus, for example, custom tags are registered through an XML <taglib="tag-library.xml">tag, according to the JSP 1.0 specification.

By way of brief background, where a plurality of custom tags exist, it is desired to provide a cataloging and registration mechanism to organize the tags and to prevent naming collisions. According to the present invention, a tag library, or "taglib," is used for this purpose. As will be described below, the tag library is preferably specified by a URI and comprises a page, preferably XML, identifying the tag namespace and listing the tags recognized in the namespace as well as the directives on how to load the appropriate tag handlers. Thus, in a representative embodiment, in thetag-library-xml file, the name of the custom tag is listed, as well as a Java object name, or a URL identifying an XSL stylesheet.

The following is an example of a custom tag library:

In the JSP context:

<jsp:root xmlns:sample="/xsp/sample/sample-taglib.xml">
</jsp:root>

Here, a namespace "sample" is defined by the relative URL of "/xsp/sample/sample-taglib.xml".

The content at the URL would look as follows:
```
<?xml version="1.0"?>
<taglib>
    <tag name="currentTime"
        class="xsp.sample.CurrentTimeTagBean"
        dtd="currentTime.dtd"/>
    <tag name="currentTimeXSL"
styleSheet="http://localhost/xsp/sample/currentTimeCustomTag.xsl"
        dtd="currentTime.dtd"/>
</taglib>
```

This registers a Java TagBean to handle sample:currentTime tags and registers the currentTimeCustomTag.xsl as an XSL handler for sample: curentTimeXSL. As a bonus, both register currentTime.dtd to verify the correctness of the sample:currentTime and sample:currentTimeXSLtags before the formatting of those tags occurs.

Returning now to FIG. 4, the routine then continues at step 410. In particular, any additional tag libraries are gathered and registered with a main tag handler. According to the present invention, a tag handler is a process that is used to hand-off execution (of a custom tag in the DOM) to some other process, e.g., a Java object (through a custom tag interface), or via an XSL stylesheet. The routine then continues at step 412 by inserting a _jspServicemethodDefinition as the last child of the jsp:root element. The methodDefinition preferably has the content of most of the servlet code. As will be described in more detail below, the jsp:block element is appended to the methodDefinition to begin the servlet's definition as a Java code block by default or with as the value of the jsp page directive attribute (if it is specified).

Figure 5:
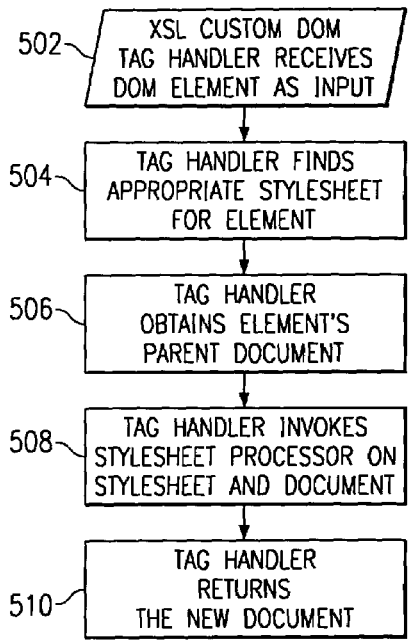
FIG. 5 is a flowchart illustrating a custom DOM tag XSL handler routine for an XSL style sheet.
Figure 6:
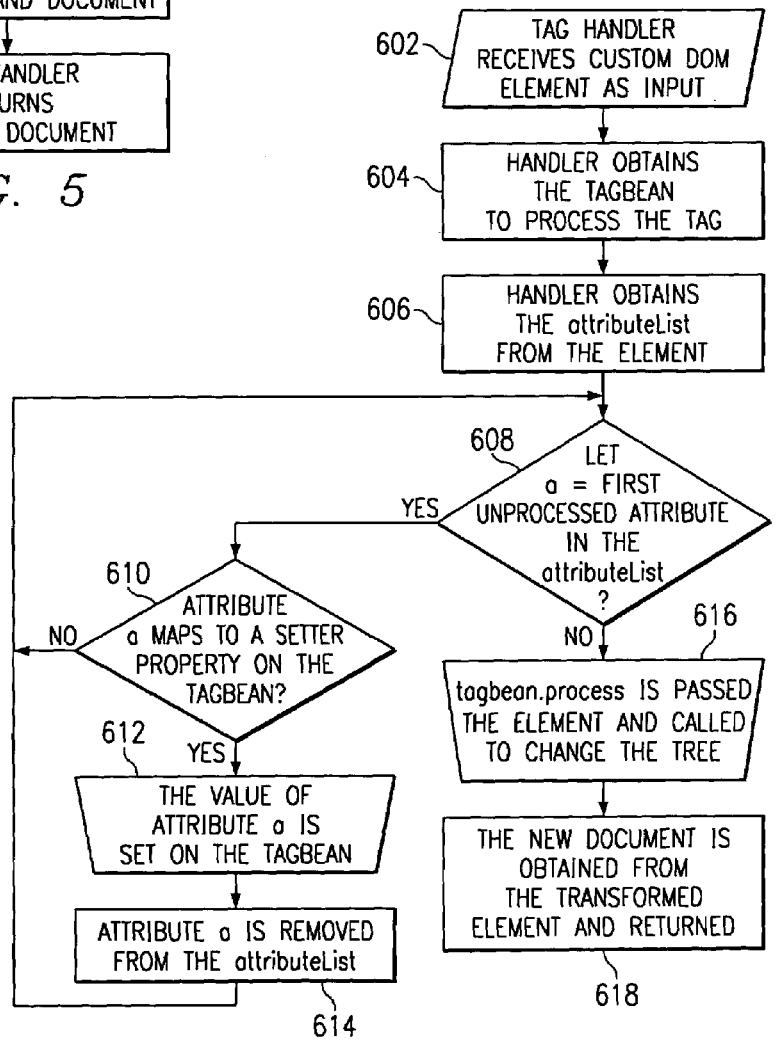
FIG. 6 is a flowchart illustrating a custom DOM tag Java handler routine for a Java object.

The main processing of the routine begins at step 416. At this step, a test is made to determine whether the DOM tree has any custom tags that have not been processed. If so, the routine branches to step 418 to locate preferably the leftmost leaf node of the tree that satisfies its requirements as a custom tag. The routine then continues at step 420 to invoke an appropriate tag handler (e.g., a Java object, the XSL stylesheet, or the like). Two variations of step 420 are illustrated in the flowcharts of FIGS. 5–6. As will be seen, the appropriate tag handler is given a current tag element and is expected to process it. Typically, a new DOM is returned from the tag handler and is then processed for new tag libraries. At step 422, the new tag libraries are registered in the tag library registry. The routine then continues at step 424 to gather all new jsp:directive tags. The routine then returns to step 416.

Figure 10:
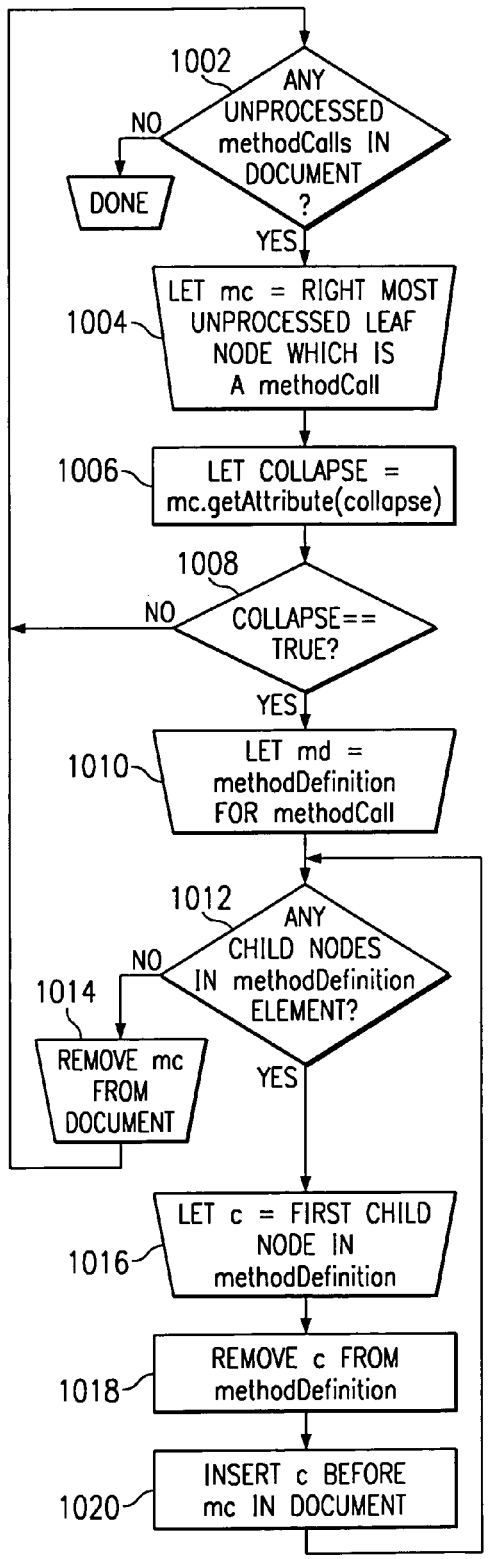
FIG. 10 is a flowchart illustrating a routine for collapsing a DOM tree into a fewest number of method calls according to the present invention.

This loop continues until all custom tags have been processed in a like manner. When the outcome of the test at step 416 is negative, the routine branches to step 426 to collapse the resulting DOM tree into as few as possible method blocks. This operation is illustrated in FIG. 10. The routine then continues at step 428 to generate the servlet by interpreting scriptlet, expression, declaration and methodDefinitions. Thus, for example, at step 428, the routine interprets the DOM by replacing "jsp:scriptlets" with in lined code, by replacing "jsp.expressions" with prints, by replacing "jsp:declarations" with variables and method definitions, by replacing "xsp:methodCalls" with method calls, and by replacing "xsp:methodDefinitions" with method definitions. As described in FIG. 2, the resulting servlet is then compiled and class loaded to be ready for use by the runtime code.

Custom Tag Definition

Preferably, the DOM tree identifies custom tags as follows. As noted above, the JSP 1.0 specification included a tag library mechanism that defines how to plug in a tag. The specification, however, left the details of the taglib mechanism completely open, with the exception that a url must be used to specify the location of the taglib. According to the present invention, this abstract concept has been unified with an XML namespace and mapped into an XML file. In an illustrative embodiment, the Document Type Definition (DTD) for a taglib according to the invention is:

```
<!ELEMENT taglib (tag)*>
<!ELEMENT tag EMPTY>
<!-Note: either class or styleSheet must exist (but preferably not both)->
<!ATTLIST tag
    name CDATA #REQUIRED
    class CDATA #IMPLIED
    styleSheet CDATA #IMPLIED
    dtd CDATA #IMPLIED>
```

This data structure defines that a tag library is composed of zero or more tags. Each tag is defined with a name and optional attributes class, styleSheet, and dtd. A tag must have either a class or styleSheet attribute (but preferably not both) to specify a correct tag handler. The value of name is used to identify what tags it handles. If a tag's name is "scriptlet" and its taglib prefix is "jsp", then this rule handles any tag named "jsp:scriptlet". The class and styleSheet attribute dictate which of the two mechanisms are used to handle a custom tag. If the rule specifies a class, then a Java object, e.g., an object satisfying a custom tag interface, is used to process the tag. If the rule specifies a styleSheet, then an XSLT styleSheet is used to process the tree. The optional dtd parameter is used to verify the contents of the custom tag, for example, whether the tag has the proper attributes.

As noted above, FIGS. 5–6 illustrate the preferred tag handling routines. As described, there are two types of tag handling: tags handled by XSLT (FIG. 5) and tags handled by Java code (FIG. 6). Each of these handlers will now be described in more detail.

XSL Custom Tag Handler

The XSL tag handler routine begins at step 502 by receiving the DOM element as input. At step 504, the tag handler then finds the appropriate stylesheet for the element as supplied by the taglib rules. The routine then continues at step 506 with the tag handler obtaining the element's parent document. At step 508, the routine invokes a stylesheet processor on the document and stylesheet. Finally, at step 510, the tag handler returns the new document to complete the translation.

Java Object Custom Tag Handler

FIG. 6 illustrates a preferred operation of the custom DOM tag Java object handler. By way of brief background, as used herein, a "tagbean" is a Java object that implements a TagBean interface. Preferably, the interface according to the invention is as follows:

```
public interface TagBean
{
    public void
    process(Element element);
}
```

The TagBean interface defines a process method that takes an element in from the DOM tree and performs some function against that element. The context of the entire DOM tree is available to the process method for manipulation through the DOM APIs.

Figure 7:
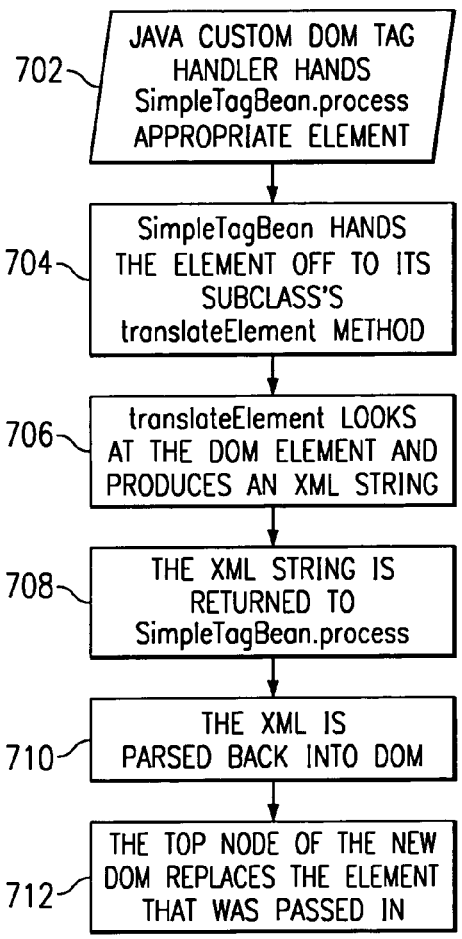
FIG. 7 is a flowchart illustrating the operation of a DOM In, Text Out tagbean.
Figure 8:
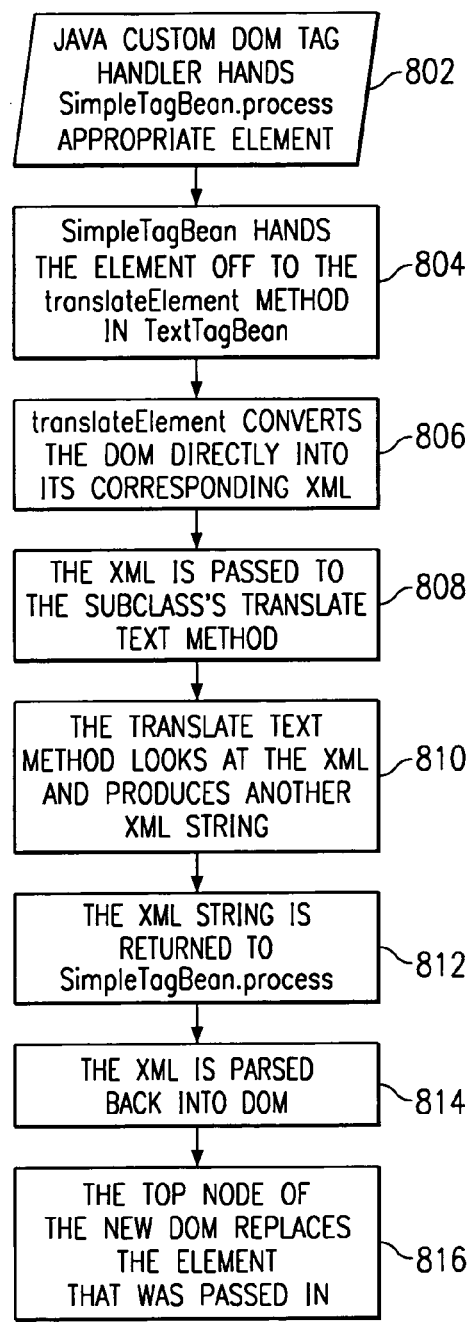
FIG. 8 is a flowchart illustrating the operation of a Text In, Text Out Text tagbean.
Figure 9:
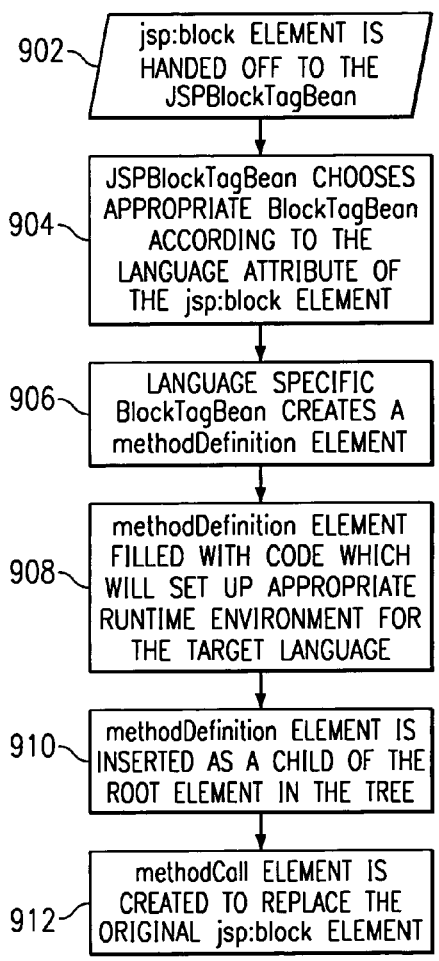
FIG. 9 is a flowchart illustrating a routine for supporting multiple scripting languages in a single page.

The routine begins at step 602 with the Java tag handler receiving the DOM element as input. At step 604, the handler then obtains the appropriate tagbean for the element as supplied by the taglib rules. A number of tagbean routines are illustrated in FIGS. 7–9 and will be described in more detailed below. At step 606, the handler extracts an attributeList from the element. The routine then performs a test at step 608 to determine whether there are any unprocessed attributes. If so, the routine branches to step 610 to determine whether the attribute maps to a setter property on the tagbean. If the outcome of the test at step 610 is negative, control returns to step 608. If, however, the outcome of the test at step 610 is positive, the routine continues at step 612 to set the value of the attribute on the tagbean. Control then continues at step 614 to remove the attribute from the attributeList. Processing then continues back at step 608.

Thus, for each attribute in the attributeList, the handler checks for a corresponding setter property on the tagbean. If a corresponding setter property exists, the value of the attribute is set on the tagbean and the attribute is removed from the attribute list. When the outcome of the test at step 608 indicates that all attributes have been checked against the tagbean, routine branches to step 616. At this step, the tagbean's process method is called given the DOM element so that it can manipulate the tree in whatever manner it deems fit. When tagbean.process( ) is complete, the new document is returned from the tag handler at step 618. This completes the processing.

FIGS. 7–9 illustrate tagbeans that are useful in the present invention.

DOM in, Text Out Tagbean

FIG. 7 illustrates a simpleDOM in, Text out macro that has the following class:

public abstract class SimpleTagBean implements TagBean
{
  public abstract String
  translateElement(Elementelement);
  public final void
  process(Element element);
}

SimpleTagBean is a class created to simplify the task of writing a tagbean. Using this class, the developer merely has to implement the translateElement method, which takes in a DOM element and returns the corresponding text macro expansion. In particular, the routine reads the DOM tree (e.g., using the DOM APIs), produces an XML block (typically a scriptlet), and uses the XML block to replace the current element in the tree. This is advantageous to the writer of the tagbean because, using the invention, he or she does not need to know how to create new nodes and to populate them with values. All the writer has to do is create an XML expanded form of the element passed in. While this approach requires increased execution time at translation, translation only happens once every time the page changes; thus, the technique has little impact on server performance.

The SimpleTagBean class works as demonstrated in the flowchart of FIG. 7. The routine begins at step 702 with the Java tag handler calls SimpleTagBean.process with the appropriate tag element. At step 704, the SimpleTagBean hands the element off to its subclass's "overwritten" translateElement method. In the translateElement method, at step 706, the subclass looks at the element and its sub-elements and attributes to produce a text macro expansion of the node. The routine then continues at step 708 with the text expansion being returned to the SimpleTagBean.process method. At step 710, the XML is parsed backed into DOM. At step 712, the top node of the new document object replaces the element that was passed in from the previous document. In particular, in step 712, the top node of the new DOM replaces the element was passed into translateElement( ). This completes the processing.

Text in, Text Out Tagbean

FIG. 8 illustrates a Text in, Text out tagbean that may be used to isolate the developer from the DOM API. This is especially useful if the element contains only simple information or does simple query string replacement. A representative class is as follows:

public abstract class TextTagBean extends SimpleTagBean
{
  public abstract String
  translateText(String text);
  public final String
  translateElement(Elementelement);
  public final void
  process(Element element);
}

TextTagBean extends the SimpleTagBean functionality. In particular, the TextTagBean extends the SimpleTagBean class and implements the translateElement function to inherit the String V DOM output functionality. Instead of the developer writing translateElement, however, he or she now writes translateText.

Referring now to FIG. 8, the routine begins at step 802 with the Java custom DOM tag handler handing the SimpleTagBean.process the appropriate element. At step 804, the routine hands the element off to the "overwritten" translateElement method. At step 806, the translateElement method converts the DOM directly into its corresponding XML. In particular, the TextTagBean.translateElement( ) takes the element and flattens it into XML without interpreting any of the XML. The routine then continues at step 808, with the XML then being passed to the translateText method of the subclass. At step 810, the translateText method reads the string and processes it to return a new XML string. In particular, translateText looks at the XML string and manipulates it to produce another text representation of it and returns this representation to TextTagBean.translateElement( ). At step 812, the new XML string is returned to the TextTagBean.translateElement, which returns the string to SimpleTagBean.process. SimpleTagBean.process finishes the processing at step 814, by turning the string into DOM and, at step 816, by replacing the previous element with the root of the new document. Thus, in step 816, the top node of the new DOM replaces the element that was passed into translateElement( ). This completes the processing.

Multiple Scripting Language Blocks

Another tagbean is illustrated in FIG. 9. This routine, called jsp:block, enables page developers to use multiple scripting languages in the same page. As will be seen, this enables people with different skill sets to add value to the same page. It also enables the developer to chose another language that might be more suitable for a specific job.

The routine begins at step 902 with each jsp:block handed off to the JSPBlockTagBean. At step 904, the JSPBlockTagBean chooses the appropriate BlockTagBean according to the language attribute of the jsp:block element. At step 906, the language-specific BlockTagBean creates a methodDefinition element which, at step 908, is then filled with code to set up an appropriate runtime environment for the target language. At step 910, the methodDefinition element is inserted as a child of the root element in the document. The routine then continues at step 912 to create a methodCall element to replace the original jsp:block element.

DOM Tree Processing

FIG. 10 illustrates a preferred routine for collapsing the DOM tree into the fewest possible methodCalls. The routine begins at step 1002 to test whether there are any unprocessed methodCalls in the document. If not, the routine is done. If, however, the outcome of the test at step 1002 is positive, the routine continues at step 1004 by setting a variable mc equal to the right-most unprocessed leaf node that is a method call. At step 1006, the routine sets a variable collapse equal to an attribute mc.getAttribute(collapse). At step 1008, the collapse attribute is checked. If this attribute is not true, control returns to step 1002. If the outcome of the test at step 1008 is positive, then the contents of the corresponding methodDefinition are expanded in place, and the methodDefinition and methodCalls are removed from the tree. In particular, the routine continues at step 1010 by setting a variable md equal to the methodDefinition for the methodCall. At step 1012, a test is run to determine whether any child nodes exist in the methoddefinition element. If not, the routine branches to step 1014 to remove mc from the document, and control returns to step 1002. If, however, the outcome of the test at step 1012 is positive, the routine continues at step 1016 to let c equal the last child node in the methoddefinition. At step 1018, c is removed from the methodDefinition. The routine then continues at step 1020 to insert c before mc in the document. Control then returns back to step 1012. This completes the processing.

For optimization purposes, it is desired to verify context between multiple related XML tags in a DOM. One or more of these related XML tags are custom tags within the context of the inventive framework. By way of brief background, when processing a single custom tag element, that element may need access to all other related tags, processed and unprocessed, within the DOM. Unfortunately, however, there may be other unprocessed custom tags in the DOM that, when processed, would result in one or more related tags the current element is interested in. One solution to this problem is to pass some state information from the current element through the page handling engine. A preferred technique, however, is to use the DOM itself to indicate state.

Clean-Up Processing

Figure 11:
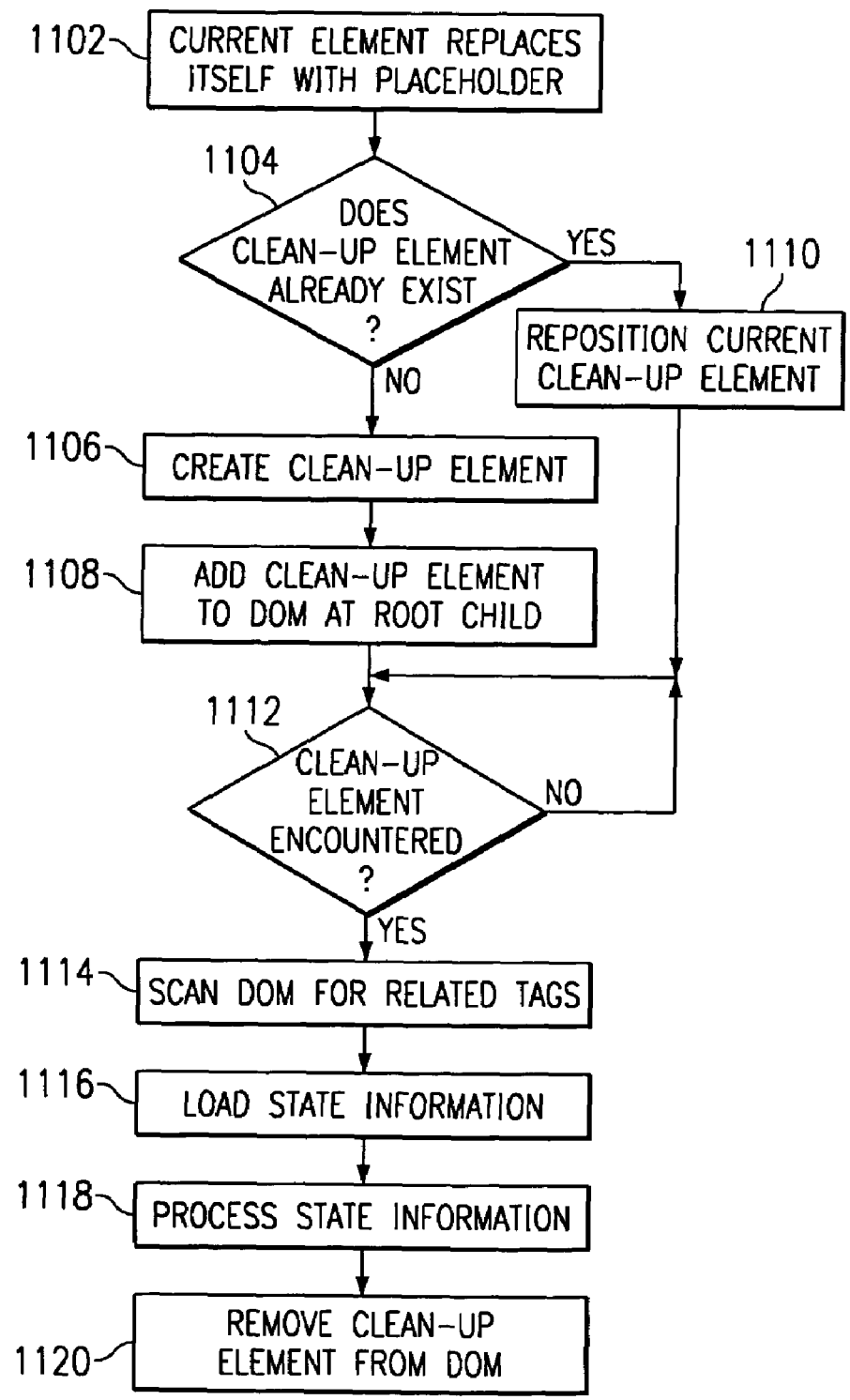
FIG. 11 is a flowchart illustrating a routine for verifying the context of related XML tag elements in a DOM tree.

FIG. 11 is a flowchart illustrating this clean-up processing. The routine begins at step 1102 during the processing of the DOM tree with a current element being processed replacing itself with a place holder element. The placeholder element includes attributes indicating its state. At step 1104, a test is performed to determine if a clean-up element already exists for the element being processed. If not, the current element then creates a clean-up element at step 1106. At step 1108, this clean-up element is added to the DOM in a position where it will be processed after all elements related to the current element have been processed. Thus, for example, the clean-up element is added to the DOM as a child node to the root position. If the outcome of the test at step 1104 indicates that such a clean-up element already exists, the current element need not create another clean-up element; rather, the current element need only move the existing clean-up element later in the DOM to ensure it is processed after any other related elements might be processed. This is step 1110. When the processing routine finally encounters the clean-up element, as indicated by a positive outcome of the test at step 1112, this element scans the entire DOM for all the related tags (now placeholders) of interest. This is step 1114. At step 1116, the clean-up element loads the state information from each and, at step 1118, processes them accordingly. When complete, at step 1120, the clean-up element removes itself from the DOM. In this way, the technique shifts processing from each individual element to a single, last-processed element.

Thus, in the preferred embodiment, a two-pass solution is implemented. In the first pass, simple translation is performed on the tag, creating new tag place holders to be handled by a clean-up phase. For example, assume the DOM includes the following tags: system:macro1, system:macro2, and system:macro3. It is also assumed that each relies on specific information from other tags but not all the information is available until all of them have been touched once. On the first pass, system:macro1 expands to _system__macro1 and performs all the metadata expansion it can perform at this time to assist the clean-up node. At this time, it also inserts a system:cleanup in the tree as the last child of jsp:root (assuming it is not already there).

The second pass is triggered when the clean-up node is hit. For proper processing, it should check to make sure the first pass has completed (no system:macro1 or macro2 or macro3 tags in the tree). If other clean-up nodes exist in the tree, it should remove itself from the tree and let the other nodes handle the clean-up later. Once the clean-up node has determined that the tree is in the correct state, it goes through all the artifacts left by the first process and expands them with all the context available.

Tagbean Code Reduction

Another optimization reduces the amount of code in the tagbeans. By way of background, if a developer expands everything necessary to perform a function of a tag, that process may produce large amounts of code. In particular, the writing of custom tagbeans may result in a large amount of Java code being generated into the resulting servlet. Because this code may be largely common across-servlets generated from the same tagbean (variable names might change, but little else), according to the invention, the functionality is delegated to outside code as much as possible. Preferably, the code is factored into a separate Java bean, and the most convenient place to delegate is the very tagbean generating the code. Thus, the tagbean need only generate enough Java code for the servlet to call out to the separate bean. This dramatically reduces the code in the tag bean handler.

As a result, this optimization improves maintainability and greatly simplifies debugging. In addition, because the code is not expanded, the function is hidden from anyone who has access to the generated servlet code. In addition, as a separate Java bean, developers are encouraged to put more error-handling code in the system that may not get put in otherwise. It also further stabilizes the system.

Thus, in a preferred embodiment, instead of doing in line expansion of code, the developer may take runtime values of attributes and sub-elements and generate code to make them parameters of a method on the very same bean that can be called at runtime to do the real work. Thus, according to the invention, at translation time, a custom tag in the DOM tree is replaced, e.g., with a script that results in a line of code in a generated servlet. In that way, when the servlet is then executed at request time, the line of code invokes a method in a custom tagbean to perform a given function.

A more detailed example of this optimization technique is set forth later in this disclosure.

EXAMPLES

As has been previously described, the flowchart of FIG. 2 illustrates the basic translation functionality of the present invention. An example of this operation is now provided. In the following example, mixedLanguages.xsp is a flat input file, mixedLanguagesDOM1.txt is a representation of the DOM after the input file has been parsed and some metadata has been added to the DOM, mixedLanguagesDOM2.txt is a representation of the DOM after the custom tags in the input file have been processed (in this case, the <block> tag is a custom tag, with the inner tag processed before the outer tag, with the resulting DOM then ready to be walked by the servlet generator routine), and mixedLanguagesServlet.java is the servlet generated by walking the DOM that complies with the JSP 1.0 specification.

mixedLanguages.xsp

```
<?xml version="1.0"?>
<jsp:root>
   <jsp:block language="java">
   <jsp:scriptlet>
   String user=request.getParameter("user");
   if (user ==null) {
   </jsp:scriptlet>
      <b>No one is logged in.</b>
      <jsp:block language="javascript">
      <jsp:scriptlet>
      var int x=0;
      x=x+1;
      </jsp:scriptlet>
      </jsp:block>
   <jsp:scriptlet>
   }
   else {
   </jsp:scriptlet>
      <b>Welcome:
      <jsp:scriptlet>
      out.println(user);
      </jsp:scriptlet>
      </b>
   <jsp:scriptlet>
   }
   </jsp:scriptlet>
   </jsp:block>
</jsp:root>
``` mixedLanguagesDOM1.txt

```
<jsp:root servletPath="c:\top\xsp\demo\test\mixedLanguagesServlet.java"
servletPackageName="xsp.test.scripting" servletClassName="mixedLanguagesServlet">
   <jsp:methodDefinition name="_jspService">
      <jsp:block language="java">
         <jsp:block language="java">
            <jsp:scriptlet>
               String user = request.getParameter("user");
               if (user == null) {
            <b>
               No one is logged in.
               <jsp:block language="javascript">
                  <jsp:scriptlet>
                     var int x = 0;
                        x = x + 1;
                  <jsp:scriptlet>
                  }
                     else {
            <b>
               Welcome:
               <jsp:scriptlet>
                  out.println(user);
               <jsp:scriptlet>
               }
``` mixedLanguagesDOM2.txt

```
<jsp:root servletPath="c:\top\xsp\demo\test\mixedLanguagesServlet.java"
servletPackageName="xsp.test.scripting" servletClassName="mixedLanguagesServlet">
   <jsp:methodDefinition name="javascriptBlock1">
      <jsp:scriptlet>
         BSFManager bsfManager = new BSFManager( );
         BSFEnvironment bsfEnvironment = new BSFEnvironment( );
         bsfEnvironment.tempDir = "c:\\top\\";
         bsfEnvironment.classPath =
"c:\\top\\;c:\\prog\\jdk118\\lib\\classes.zip;c:\\top;c:\\prog\\xml4j\\xml4j_1_1_16.jar;c:\\prog\\lotusxsl_0
_17_0\\lotusxsl.jar;c:\\prog\\SQLLIB\\java\\db2java.zip;c:\\prog\\SQLLIB\\java\\runtime.zip;c:\\prog\\
websphere\\appserver\\lib\\ibmwebas.jar;c:\\prog\\websphere\\appserver\\lib\\jsdk.jar;c:\\prog\\websphe
re\\appserver\\lib\\jst.jar;c:\\top\\bsf-1.0b6\\lib\\bsf.jar;c:\\top\\bsf-1.0b6\\lib\\js.jar;c:\\top\\bsf-1.0b6\\lib
\\NetRexxC.zip;c:\\prog\\websphere\\appserver\\lib\\x509v1.jar;.;c:\\prog\\websphere\\appserver\\lib\\ej
s.jar;c:\\c:\\prog\\websphere\\appserver\\properties\\ejs;C:\\prog\\jdk116\\bin\\..\\classes;C:\\prog\\jdk1
16\\bin\\..\\lib\\classes.zip;C:\\prog\\jdk116\\bin\\..\\lib\\classes.jar;C:\\prog\\jdk116\\bin\\..\\lib\\rt.jar;C
:\\prog\\jdk116\\bin\\..\\lib\\i18n.jar";
         bsfEnvironment.classLoader = this.getClass( ).getClassLoader( );
         bsfManager.setBSFEnvironment(bsfEnvironment);
         BSFEngine javascriptInterpreter =
            bsfManager.loadScriptingEngine("javascript");
         javascriptInterpreter.setDebug(true);
         bsfManager.registerBean("request", request);
         bsfManager.registerBean("response", response);
         bsfManager.registerBean("session", session);
         bsfManager.registerBean("out", out);
         bsfManager.registerBean("pageContext", pageContext);
         bsfManager.registerBean("page", this);
         try {
            javascriptInterpreter.eval("var request = bsf.lookupBean(\"request\");\nvar response =
bsf.lookupBean(\"response\");\nvar session = bsf.lookupBean(\"session\");\nvar out =
bsf.lookupBean(\"out\");\nvar pageContext = bsf.lookupBean(\"pageContext\");\nvar page =
bsf.lookupBean(\"page\");\n\n       var int x = 0;\n      x = x + 1;\n        ");
         } catch (BSFException e) {
            Throwable realException = e.getTargetException( );
            while (realException instanceof BSFException) {
               realException = ((BSFException) realException).getTargetException( );
               while (realException instanceof java.lang.reflect.InvocationTargetException) {
                  realException = ((java.lang.reflect.InvocationTargetException)
realException).getTargetException( );
               }
            }
            realException.printStackTrace( );
            throw new ServletException(realException.getMessage( ));
         }
         bsfManager.unregisterBean("request");
         bsfManager.unregisterBean("response");
         bsfManager.unregisterBean("session");
         bsfManager.unregisterBean("out");
         bsfManager.unregisterBean("config");
         bsfManager.unregisterBean("pageContext");
         bsfManager.unregisterBean("page");
   <jsp:methodDefinition name="_jspService">
      <jsp:scriptlet>
         String user = request.getParameter("user");
            if (user == null) {
      <b>
         No one is logged in.
      <jsp:methodCall name="javascriptBlock1">
      <jsp:scriptlet>
         }
            else {
      <b>
         Welcome:
         <jsp:scriptlet>
            out.println(user);
         <jsp:scriptlet>
      }
```

| mixedLanguagesServlet.java |
|---|

```java
package xsp.test.scripting;
import org.w3c.dom.*;
import java.beans.*;
import com.lotus.xsl.xml4j2tx.*;
import java.io.*;
import com.ibm.bsf.*;
import java.util.*;
import com.sun.server.http.*;
import javax.servlet.jsp.*;
import com.lotus.xsl.*;
import javax.servlet.*;
import xsp.*;
import com.ibm.servlet.pagecompile.*;
import com.ibm.xml.parser.*;
import java.net.*;
import com.sun.server.util.*;
import java.lang.*;
import javax.servlet.http.*;
import com.ibm.servlet.engine.*;
public class mixedLanguagesServlet
   extends xsp.ContractServlet
{
   public void
   _jspService(HttpServletRequestreq,
         HttpServletResponseres)
      throws ServletException, IOException
   {
      // Cast to HttpService objects for setAttribute/callPage
      HttpServiceRequestrequest = (HttpServiceRequest) req;
      HttpServiceResponseresponse =
         new PCHttpServletResponseProxy((SEHttpServiceResponse)res);
      JspWriter out = null;
      // Create the JspFactory and obtain the PageContext
      JspFactory factory = JspFactory.getDefaultFactory( );
      PageContext pageContext =
         factory.getPageContext(this, // JSP page
               request, // Servlet request
               response, // Servlet response
               null, // Error page URL
               true, // Servlet session
               0, // JSP buffer size
               true); // JSP autoflush
      try {
         // Initialize all the implicit variables
         HttpSession session = request.getSession(true);
         out = pageContext.getOut( );
         Object page = this;
         response.setContentType("text/html;charset=ISO-8859-1 ");
         // Now generate fixed template and script code
            String user = request.getParameter("user");
            if (user == null) {
         out.print("<b>");
         out.println( );
         out.println("No one is logged in.");
         out.println("</b>");
         javascriptBlock1(request,
               response,
               session,
               out,
               pageContext,
               page);
         }
            else {
         out.print("<b>");
         out.println( );
         out.println("Welcome:");
            out.println(user);
         out.println("</b>");
         }
      } finally {
         out.close( );
         ((PCHttpServletResponseProxy)response).writeOutResponse( );
         factory.releasePageContext(pageContext);
      }
   }
   public void
   javascriptBlock1(HttpServiceRequestrequest,
```

-continued mixedLanguagesServlet.java

```
        HttpServiceResponseresponse,
        HttpSession session,
        JspWriter out,
        PageContext pageContext,
        Object page)
  throws ServletException, IOException
{
    BSFManager bsfManager = new BSFManager( );
    BSFEnvironment bsfEnvironment = new BSFEnvironment( );
    bsfEnvironment.tempDir = "c:\\top\\";
    bsfEnvironment.classPath =
"c:\\top\\;c:\\prog\\jdk118\\lib\\classes.zip;c:\\top;c:\\prog\\xml4j\\xml4j_1_1_16.jar;c:\\prog\\lotusxsl_0
_17_0\\lotusxsl.jar;c:\\prog\\SQLLIB\\java\\db2java.zip;c:\\prog\\SQLLIB\\java\\runtime.zip;c:\\prog\\
websphere\\appserver\\lib\\ibmwebas.jar;c:\\prog\\websphere\\appserver\\lib\\jsdk.jar;c:\\prog\\websphe
re\\appserver\\lib\\jst.jar;c:\\top\\bsf-1.0b6\\lib\\bsf.jar;c:\\top\\bsf-1.0b6\\lib\\js.jar;c:\\top\\bsf-1.0b6\\lib
\\NetRexxC.zip;c:\\prog\\websphere\\appserver\\lib\\x509v1.jar;.;c:\\prog\\websphere\\appserver\\lib\\ej
s.jar;c:\\;c:\\prog\\websphere\\appserver\\properties\\ejs;C:\\prog\\jdk116\\bin\\..\\classes;C:\\prog\\jdk1
16\\bin\\..\\lib\\classes.zip;C:\\prog\\jdk116\\bin\\..\\lib\\classes.jar;C:\\prog\\jdk116\\bin\\..\\lib\\rt.jar;C
:\\prog\\jdk116\\bin\\..\\lib\\i18n.jar";
    bsfEnvironment.classLoader = this.getClass( ).getClassLoader( );
    bsfManager.setBSFEnvironment(bsfEnvironment);
    BSFEngine javascriptInterpreter =
        bsfManager.loadScriptingEngine("javascript");
    javascriptInterpreter.setDebug(true);
    bsfManager.registerBean("request", request);
    bsfManager.registerBean("response", response);
    bsfManager.registerBean("session", session);
    bsfManager.registerBean("out", out);
    bsfManager.registerBean("pageContext", pageContext);
    bsfManager.registerBean("page", this);
    try {
        javascriptInterpreter.eval("var request = bsf.lookupBean(\"request\");\nvar response =
bsf.lookupBean(\"response\");\nvar session = bsf.lookupBean(\"session\");\nvar out =
bsf.lookupBean(\"out\");\nvar pageContext = bsf.lookupBean(\"pageContext\");\nvar page =
bsf.lookupBean(\"page\");\n\n       var int x = 0;\n       x = x + 1;\n         ");
    } catch (BSFException e) {
        Throwable realException = e.getTargetException( );
        while (realException instanceof BSFException) {
            realException = ((BSFException)realException).getTargetException( );
            while (realException instanceof java.lang.reflect.InvocationTargetException) {
                realException = ((java.lang.reflect.InvocationTargetException)
realException).getTargetException( );
            }
        }
        realException.printStackTrace( );
        throw new ServletException(realException.getMessage( ));
    }
    bsfManager.unregisterBean("request");
    bsfManager.unregisterBean("response");
    bsfManager.unregisterBean("session");
    bsfManager.unregisterBean("out");
    bsfManager.unregisterBean("config");
    bsfManager.unregisterBean("pageContext");
    bsfManager.unregisterBean("page");
  }
}
```

The following illustrates more generally how an input file is translated into a DOM data structure. In particular, for a given input file:

```
<a>
  <b>
    <c/>
    <d/>
  </b>
  <e>
    <f/>
      <g/>
    <h/>
```

-continued

```
  </e>
</a>,
``` the DOM data structure would look as follows:

```
a
|--b
|  |--c
|  |--d
|
|--e
   |--f
   |  |--g
   |--h
```

Thus, in this example, node a is a parent node that has child nodes b and e. Node b has child nodes c and d, and node e has child nodes f and h. Node f has child node g. In the preferred embodiment, the order of node execution would then be as follows: c, =d, b, g, f, h, e and a. The value of executing the nodes in an inside-out fashion is that the innermost tagbean can replace itself with a JSP syntax element that is well known to an outer tagbean so that the outer tagbean knows how to process the internal element.

For example, in the case of the multi-language support, like:

```
<block language="java">
   <jsp:scriplet>
      javaExpression;
   javaExpression2;
   </jsp:scriptlet>
   <block language="javascript">
      <jsp:scriptlet>
         javascriptExpression;
         javascriptExpression2;
      <jsp:scriptlet>
   </block>
</block>
```

The block tag is a custom tag. When this tag executes, it transforms everything inside it into Java code. The invention is able to transform the contained custom tag because the innermost custom tag preferably is handled first, and such processing leaves behind a well known tag that the outer most custom tag handler knows how to transform.

The following code illustrates how scripting language blocks may be used to support multiple scripting languages in a single web page. As described above, nesting of different scripting languages is supporting by marking where one section, or "block", of code begins and where it ends. For example, the following snippet has JavaScript code nested within REXX code nested within Java code:

```
if (true)
   {
   say I am true
   if also Tue then do
      var i=5;
   end
   System.out.println(bean.getProperty( ));
}
```

If this code were to appear in a web page, the blocks of code may be marked as follows:

```
<BLOCK language="java">
if (true)
   {
   <BLOCK language="netrexx">
   say I am true
   if also True then do
      <BLOCK language="javascript">
      var i=5;
   </BLOCK>
   end
   </BLOCK>
   System.out.println(bean.getProperty( ));
}
</BLOCK>
```

In the above example, it can be seen that "end" is associated with "ifalso True then do" and not, for example, with "var i=5." This enables the code to correctly process all the languages at runtime. In the above example, it should be noted that the blocks are nested. This is not a limitation. Indeed, there is no reason they cannot be peers, as below:

```
<BLOCK language="java">
// a little Java code here
</BLOCK>
<BLOCK language="javascript">
/* some JavaScript code here */
</BLOCK>.
```

As described, the implementation compiles a web page into a XML (extensible Markup Language) DOM (Document Object Model), and from there, into a Java servlet. In the DOM stage, the routine looks for BLOCK nodes. When encountering one, the routine creates a new node representing a Java method definition as a child of the root element, and replaces the BLOCK node with a node representing a Java method call to the new method definition. The block's child nodes are then moved under the method definition. Java servlet code is then generated under the method definition to pass the script code contained in the block to an appropriate interpreter for the scripting language specified by the block's "language" attribute.

The same operation is done for nested blocks. The innermost block is turned into a method definition and replaced by the method call node. When the next outer block is processed into its method definition, the block must turn any method call nodes among its children into valid method calls into the servlet written in the outer block's language. In the nested example above, the resulting Java servlet might then contain code as follows:

```
protected void
javaBlock0(args)
{
   if (true)
      {
      netrexxBlock0(args);
      System.out,println(bean.getProperty( ));
      }
}
protected void
javascriptBlock0(args)
{
   javascriptInterpreter.process("var i=5;");
}
protected void
netrexxBlock0(args)
{
   netrexxInterpreter.process("say I am true \n if also True
      then do \n this Servlet.javascriptBlock0(args)$_n$ end");
}
```

The bolded text above represents the method call node transformed into a valid method call in the particular scripting language. Because in the preferred embodiment the runtime is written in Java, a special interpreter is not required to handle the javaBlock0 script code.

The following illustrates how the invention verifies context between multiple related XML tags. This example starts with a sample input XML chunk and ends with a code chunk for use in the final servlet:

(1) xml

```
<trace:sink file="/myTrace.out">
   <trace:output>foo + bar</trace:output>
</trace:sink>
```

(2) trace:output is handled by TagBean
  creates a marker with all currently known state
  creates a trace:cleanup-markers tag which will signal the 2nd pass

```
<trace:cleanup-markers/>
<trace:sink file="/myTrace.out">
    <__trace__output__marker>foo      +      bar</
    __trace__output__marker>
</trace:sink>
(3) trace:sink is handled
    produces scriptlets to handle body of the work
    adds metadata to __trace__output__marker
<trace:cleanup-markers/>
<jsp:scriptlet>
try
    FileWriterfileWriter=new FileWriter("/myTrace.out");
    PrintWriter printWriter=new PrintWriter(fileWriter);
</j sp: scriptlet>
<__trace__output__marker output="printWriter">foo + bar</
    __trace__output__marker>
<jsp:scriptlet>
    } finally {
        printWriter.flush( );
        fileWriter.flush( );
        printWriter.close( );
        fileWriter.close( );
    }
</jsp:scriptlet>
(4) trace:cleanup-markers is handled
    replaces __trace__output__marker with a jsp:scriptlet
<jsp:scriptlet>
try
    FileWriterfileWriter=new FileWriter("/myTrace.out");
    PrintWriter printWriter=new PrintWriter(fileWriter);
</jsp:scriptlet>
<jsp:scriptlet>
    printWriter.println(foo + bar);
</jsp:scriptlet>
<jsp:scriptlet>
    } finally {
        printWriter.flush( );
        fileWriter.flush( );
        printWriter.close( );
        fileWriter.close( );
    }
</jsp:scriptlet>
(5) final translation step of jsp:scriptlet to Java code
    try
        FileWriter fileWriter=new FileWriter("/myTrace.out");
        PrintWriter printWriter=new PrintWriter(fileWriter);
        printWriter.println(foo + bar);
    } finally {
        printWriter.flush( );
        fileWriter.flush( );
        printWriter.close( );
        fileWriter.close( );
```

As also noted above, the present invention provides a technique for reducing the amount of code in the tagbeans. An example of this optimization technique is now provided. The following ServletTagBean.j is the original code file:

```
package xsp.was;
import xsp.*;
import java.util.*;
import org.w3c.dom.*;
import javax.servlet.jsp.*;
public class ServletTagBean extends SimpleTagBean
{
    protected String name = null;
    protected String code = null;
```

-continued

```
    protected String codebase= null;
    public void
    setName(String name)
    {
        this.name = name;
    }
    public void
    setCode(String code)
    {
        this.code = code;
    }
    public void
    setCodebase(String codebase)
    {
        this.codebase = codebase;
    }
    public String
    translateElement(Element element)
    {
        Hashtable initParams = parseInitParams(element);
        // For each param sub element, add the name/value to a map for later
        Hashtable paramMap = Utility.parseParams(element);
    // The name or code parameter must be set.
    if (name == null && code == null) {
        // Error!!!
        System.out.println("Error: name and code can not be null the same
        time");
        return null;
    }
    StringBuffer buff = new StringBuffer( );
    buff.append("\n")
        .append("<")
        .append(SCRIPTLETTAG)
        .append(">\n\n")
        .append("try {\n")
        .append(" String __code = null;\n");
    if (name == null) {
        buff.append(" String __name = null;\n");
    }
    else {
        buff.append(" String __name = \" ")
            .append(name)
            .append("\";\n");
    }
    if (code != null) {
        buff.append(" __code = \" ")
            .append(code)
            .append("\";\n\n");
    }
    buff.append("\n if (__name == null || __name.equals(\"\")) {\n")
        .append(" __name = __code;\n")
        .append(" }\n\n")
        .append(" Servlet__s = \n")
        .append(" getServletConfig( ).getServletContext( ).")
        .append("getServlet(__name);\n")
        .append(" if (__s == null) {\n")
        .append(" Properties __init = new Properties( );\n")
        .append(" __init.put(\"name\", \" ")
        .append(name)
        .append("\");\n");
    if (code != null) {
        buff.append(" __init.put(\"code\", \" ")
            .append(code)
            .append("\");\n");
    }
    if (initParams.size( ) > 0) {
        Enumeration e = initParams.keys( );
        while (e.hasMoreElements( )) {
            String key = (String) e.nextElement( );
            String value = (String) initParams.get(key);
            buff.append(" __init.put(\" ")
                .append(key)
                .append("\", \" ")
                .append(value)
                .append("\");\n");
        }
    }
    if (codebase != null) {
        buff.append(" __init.put(\"codebase\", \" ")
```

```
            .append(codebase)
            .append("\");\n")
            .append(" _s = ")
            .append("com.sun.server.http.pagecompile.\n")
            .append("\tServletUtil.loadServlet(this,")
            .append("\n\t\t\t\t_name,\n\t\t\t\t_code,")
            .append(" \n\t\t\t\t\" ")
        .append(codebase)
            .append("\", \n\t\t\t\t_init);\n");
    }
    if (codebase == null) {
        buff.append(" _s = ")
            .append("com.sun.server.http.pagecompile.\n\tServletUtil.")
            .append("loadServlet(this,")
            .append("\n\t\t\t\t_name,")
            .append(" \n\t\t\t\t_code,\n\t\t\t\tnull,")
            .append("\n\t\t\t\t_init);\n");
    }
    buff.append(" }\n\n");
    if (paramMap.size() > 0) {
        buff.append(" java.util.Hashtable _parm = new ")
            .append(" java.util.Hashtable( );\n");
        Enumeration e = paramMap.keys( );
        buff.append(" String[ ] _vals; \n");
        while (e.hasMoreElements( )) {
            String key = (String) e.nextElement( );
            String value = (String) paramMap.get(key);
            buff.append("_vals = new String[1];\n")
                .append("_vals[0] = \" ")
                .append(value)
                .append("\";\n")
                .append("_parm.put(\" ")
                .append(key)
                .append("\",_vals);\n");
        }
    }
    buff.append("\n out.flush( );");
    buff.append("\n if (_s != null) {\n");
    if (paramMap.isEmpty( )) {
        buff.append(" com.sun.server.http.pagecompile.")
            .append("ServletUtil.")
            .append("callServlet(_s, _name, request, response);\n");
    } else {
        buff.append(" HttpServletRequest_r;\n")
            .append("\n _r = new \n com.sun.server.http.")
            .append("pagecompile.ParamsHttpServletRequest(")
            .append("request,\n\t\t\t\t\t\t    _parm);\n")
            .append(" com.sun.server.http.pagecompile.")
            .append("ServletUtil.callServlet(_s,")
            .append("\n\t\t\t\t\t\t    _name,")
            .append("\n\t\t\t\t\t\t    _r, ")
            .append("\n\t\t\t\t\t\t    response);\n");
    }
    buff.append(" }\n")
        .append("} catch(Exception e) {\n")
        .append(" e.printStackTrace( ); \n")
        .append(" throw new ServletException(\"Exception")
        .append("caught for servlet:\" +\n       e.getMessage( ));\n")
        .append("}\n")
        .append("\n</")
        .append(SCRIPTLETTAG)
        .append(">");
    return buff.toString( );
}
public Hashtable
parseInitParams(Element element)
{
    Hashtable initParams = new Hashtable( );
    NamedNodeMap namedNodeMap = element.getAttributes( );
    int attributeLength = namedNodeMap.getLength( );
    Node attributeNode = null;
    String nodeName = null;
    String nodeValue = null;
    for (int i = 0; i < attributeLength; i++) {
        attributeNode = namedNodeMap.item(i);
        nodeName = attributeNode.getNodeName( );
        nodeValue = attributeNode.getNodeValue( );
//      System.out.println("nodeName==" + nodeName +
//          "nodeValue==" + nodeValue);
        if (!(nodeName.equals("type")) &&
            !(nodeName.equals("Name")) &&
            !(nodeName.equals("Code")) &&
            !(nodeName.equals("Codebase"))){
            initParams.put(nodeName, nodeValue);
        }
    }
    return initParams;
}
}
```

The following class, ServletTagBean.java, is the recoded class using the delegation model of the invention.

```
package xsp.was;
import xsp.*;
import java.io.*;
import java.util.*;
import org.w3c.dom.*;
import javax.servlet.*;
import javax.servlet.http.*;
import javax.servlet.jsp.*;
import com.sun.server.http.pagecompile.*;
public class ServletTagBean extends SimpleTagBean
{
    protected static int count = 0;
    public String
    translateElement(Element element)
    {
        Properties initParameters = parseInitParams(element);
        Hashtable runtimeParameters = Utility.parseParams(element);
        String name = (String) initParameters.get("name");
        String code = (String) initParameters.get("code");
        String codebase = (String) initParameters.get("codebase");
        // The name or code parameter must be set.
        if ((name == null) &&
            (code == null)) {
            System.out.println("Error: name and code can not be null the same time");
            return null;
        }
        int currentCount = ++count;
        String initParametersName =
            "_xsp_servletTagBean_initParameters" + currentCount;
        String runtimeParametersName =
            "_xsp_servletTagBean_runtimeParameters" + currentCount;
        String output =
            INDENT2 + "<jsp:scriptlet>\n" +
            INDENT2 + "Properties" + initParametersName +"=" +
            "new Properties( );\n" +
            INDENT2 + "Properties" + runtimeParametersName +
            "= new Properties( );\n";
        Enumeration enumeration = initParameters.keys( );
        while (enumeration.hasMoreElements( )) {
            String key = (String) enumeration.nextElement( );
            String value = (String) initParameters.get(key);
            output +=
                INDENT2 + initParametersName + ".put(" +
                stringify(key) + ", " +
                stringify(value) + ");";
        }
        enumeration = runtimeParameters.keys( );
        while (enumeration.hasMoreElements( )) {
            String key = (String) enumeration.nextElement( );
            String value = (String) runtimeParameters.get(key);
            output +=
                INDENT2 + runtimeParametersName + ".put(" +
                stringify(key) + ", " +
                stringify(value) +");";
        }
        output +=
            INDENT2 + "xsp.was.ServletTagBean.runServlet(this, \n" +
            INDENT3 + "request,\n" +
            INDENT3 + "response,\n" +
            INDENT3 + initParametersName + ",\n" +
```

-continued

```
      INDENT3 + runtimeParametersName + ");";
    output +=
      INDENT2 + "</jsp:scriptlet>\n";
    return output;
}
protected static final String
normalize(String input)
{
    if (input == null) {
        return null;
    }
    input = input.trim( );
    if (input.equals(" ")) {
        return null;
    }
    return input;
}
protected static final String
stringify(String input)
{.
    if (input == null) {
        return "null";
    }
    return "\" " + input + "\" ";
}
public static void
runServlet(Servlet containingServlet,
           HttpServletRequest request,
           HttpServletResponseresponse,
           Properties initParameters,
           Properties runtimeParameters)
    throws ServletException, IOException
{
    String name = normalize((String) initParameters.get("name"));
    String code = normalize((String) initParameters.get("code"));
    String codebase = normalize((String) initParameters.get("codebase"));
    if ((name == null) &&
        (code == null)) {
        throw new IllegalStateException("name or code must be non-null");
    }
    if (name == null) {
        name = code;
    }
    initParameters.put("name", name);
    if (code != null) {
        initParameters.put("code", code);
    }
    Servlet servlet = ServletUtil.loadServlet(containingServlet,
             name,
             code,
                codebase,
                initParameters);
    if (!runtimeParameters.isEmpty( )) {
        request = new ParamsHttpServletRequest(request,
            runtimeParameters);
    }
    ServletUtil.callServlet(servlet, name, request, response);
}
public Properties
parseInitParams(Element element)
{
    Properties initParams = new Properties( );
    NamedNodeMap namedNodeMap = element.getAttributes( );
    int attributeLength = namedNodeMap.getLength( );
        Node attributeNode = null;
        String nodeName = null;
        String nodeValue = null;
        for (int i = 0; i < attributeLength; i++) {
            attributeNode = namedNodeMap.item(i);
            nodeName = attributeNode.getNodeName( );
            nodeValue = attributeNode.getNodeValue( );
            initParams.put(normalize(nodeName),
                    normalize(nodeValue));
        }
        return initParams;
    }
}
```

The developer need not write code generation code to produce code that will be robust for every possible input scenario. Instead, the developer need only write the code once, and the only code generation is used to delegate to the method that is written once.

So, to provide a generic example:
1. String output="out.write(\" "+string+"\"/);"; becomes:
2. String output="PrintTagBean.print(out, \" "+string+"\");";

The out.write( ) is moved into a method print( ) on PrintTagBean:
public static void
print(Writer out, String string)
{
    out.write(string);
}

As can be seen, in the first case, the code relies upon a variable 'out' that exists in the servlet. The write( ) method was called on 'out' passing it a string. Thus, to perform proper delegation, a method on PrintTagBean is created that takes 'out' and the 'string' and calls "out.write(string)".

Thus, according to the invention, at translation time, a custom tag in the DOM tree is replaced, e.g., with a script that results in a line of code in a generated servlet. In this way, when the servlet is then executed at request time, the line of code invokes a method in a custom tagbean to perform a given function.

If the code generated to handle runtime requests is longer than the code generated to pass the necessary variables to a method to be processed, there are several benefits to this approach. First, writing code to generate code is a very tedious and error-prone task; thus, reducing this code even slightly reduces the numbers of errors drastically. Second, using this approach, all the code handling of a task is actually handled in a single method that can be carefully crafted to handle correct inputs to produce the right output. Because this code is in the tagbean, it can be compiled immediately and checked for language syntax errors. If, instead, the code is generated each time, it will not be compiled until an XSP is written to test the functionality. Moreover, with branching (if statements) in code generation, it may take several tests just to test the syntax of all the possible code generations. Further, if the developer needs to change the function and "optimization" has already taken place, then the developer need only update a single method. Otherwise, the developer must go through the process of updating all the code generating code.

Because of this reduction in code and code complexity, the maintenance of the code will be much lower.

The present invention provides numerous other advantages over the prior art. In effect, the inventive page handling mechanism combines the manipulation and template mechanism of XSLT with the scripting capabilities of the JSP/ASP model. In addition, the invention provides a framework for enabling any programming language to be plugged into that model. Further, given that most languages are easily defined in Java byte code, the invention is economical to implement in a runtime using, for example, a Java Virtual Machine.

The present invention uses custom DOM tags together with a framework and runtime that provides a powerful macro language to XML/JSP. The custom DOM tags allow a web page author the ability to define a simple markup language tag, e.g., <SHOPPING_CART>, that, at page translation time, is converted into script code by a generic Java object or an XSL stylesheet. This script code is then compiled into Java code and then into a Java servlet, yielding excellent performance servicing a client's request.

Because the custom tag replaces the script code in the authored page, the page is kept clean and easy to maintain. The script code is kept separate and, thus, need only be debugged once. Normal ASP development, on the contrary, would force this code to remain in the page, and it would have to be debugged after every modification.

The inventive framework is quite advantageous in that it is built on top of XML. Moreover, one of ordinary skill will appreciate that the framework is defineable programmatically or with XSL. In addition, macros written according to the invention can affect the output of an entire page and not just the content between a given pair of tags.

The invention also enables one or more web page authors to support multiple scripting languages in a single web page. Further, in a preferred embodiment, the context of multiple related XML tags in a DOM may be verified by using the DOM itself to indicate state information.

As noted above, the inventive mechanism is preferably implemented in or as an adjunct to a web server. Thus, the invention does not require any modifications to conventional client hardware or software. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described my invention, what I claim as new and desire to secure by Letters Patent is set forth in the following claims.

What is claimed is:

1. A method for serving a web page, comprising the steps of:
   registering a set of custom tags in a tag library, wherein the tag library contains one or more elements defining custom tags, wherein an element defining a custom tag contains an attribute for a tag handler that processes an instance of the custom tag;
   processing a given file into XML compliant code;
   translating the XML compliant code into an object model representation having at least one custom tag;
   processing the object model representation to generate executable code; and
   invoking the executable code to generate the web page.

2. The method as described in claim 1 wherein the step of processing the object model representation includes the steps of:
   parsing the object model representation to identify a custom tag; and
   upon identifying a custom tag, invoking a handler that converts the custom tag into a given representation.

3. The method as described in claim 2 wherein the given representation is script code.

4. The method as described in claim 2 wherein the handler is a stylesheet handler.

5. The method as described in claim 4 wherein the step of invoking the handler comprises:
   loading a stylesheet; and
   passing the stylesheet and the object model representation to a processor.

6. The method as described in claim 2 wherein the handler is a Java handler.

7. The method as described in claim 6 wherein the step of invoking the handler comprises:
   loading a Java object;
   calling a process method on the Java object; and
   replacing the custom tag with the given representation.

8. The method as described in claim 1 wherein the executable code is a servlet.

9. The method as described in claim 1 wherein the object model representation is a tree data structure.

10. A method of serving a web page, comprising the steps of:
    registering a set of custom tags in a tag library, wherein the tag library contains one or more elements defining custom tags, wherein an element defining a custom tag contains an attribute for a tag handler that processes an instance of the custom tag;
    upon a given occurrence, processing a flat file into XML compliant code;
    translating the XML compliant code into a document object model having a subset of the set of custom tags;
    processing the document object model to generate a servlet;
    compiling the servlet into executable code; and
    invoking the executable code to generate the web page.

11. The method as described in claim 10 wherein the given occurrence is a first access of the web page.

12. The method as described in claim 10 wherein the document object model is a tree structure.

13. The method as described in claim 12 wherein the step of processing the document object model includes the steps of:
    parsing the tree structure to identify each custom tag; and
    upon identifying each custom tag, invoking a handler that converts the custom tag into given script code.

14. The method as described in claim 13 wherein the handler applies a XSL stylesheet to generate the given script code.

15. The method as described in claim 13 wherein the handler executes a Java code object to generate the given script code.

16. A computer program product in a computer-readable medium for managing the serving of a web page from a server, comprising:
    means for registering a set of custom tags in a tag library, wherein the tag library contains one or more elements defining custom tags, wherein an element defining a custom tag contains an attribute for a tag handler that processes an instance of the custom tag;
    means operative upon a given occurrence for processing a flat file into XML compliant code;

means for translating the XML compliant code into a document object model having a set of custom tags; and means for processing the document object model to generate servlet code that may be compiled and invoked to generate the web page.

17. The computer program product as described in claim 16 further including means for registering a superset of custom tags.

18. The computer program product as described in claim 16 wherein the means for processing comprises:

means for parsing the tree structure to identify each custom tag; and means responsive to identification of a custom tag for invoking a handler that converts the custom tag into given script code.

19. The computer program product as described in claim 18 wherein the handler applies a XSL stylesheet to generate the given script code.

20. The computer program product as described in claim 18 wherein the handler executes a Java object to generate given script code.

21. A server, comprising:

a processor;

an operating system;

a server program;

a registry of custom tags containing one or more elements defining custom tags, wherein an element defining a custom tag contains an attribute for a tag handler that processes an instance of the custom tag;

means operative upon a given occurrence for processing a flat file into XML compliant code;

means for translating the XML compliant code into a document object model having a set of custom tags;

means for processing the document object model to generate servlet code;

means for compiling and class loading the servlet code; and means for invoking the servlet code to generate the web page.

* * * * *